United States Patent [19]

Cole et al.

[11] 3,967,709

[45] July 6, 1976

[54] INTERLOCK SYSTEM FOR PARKING BRAKE AND TRANSMISSION CONTROL

[75] Inventors: Carroll R. Cole; Richard E. Guhl; Larry R. Logemann, all of Decatur, Ill.

[73] Assignee: Caterpillar Tractor Co., Peoria, Ill.

[22] Filed: Dec. 10, 1974

[21] Appl. No.: 531,266

[52] U.S. Cl............................ 192/4 A; 200/153 P; 74/483 K
[51] Int. Cl.²........................................ B60K 29/02
[58] Field of Search................. 192/4 A; 200/61.86, 200/153 P; 74/483 K, 483 R, 491, 507; 192/4 C

[56] References Cited
UNITED STATES PATENTS

| | | | |
|---|---|---|---|
| 2,039,553 | 5/1936 | Roehl................................ | 192/4 A |
| 2,344,881 | 3/1944 | Jory................................. | 192/4 C X |
| 3,780,839 | 12/1973 | Schroeder........................... | 192/4 A |
| 3,858,695 | 1/1975 | Whisler.............................. | 192/4 A |

*Primary Examiner*—Benjamin W. Wyche
*Attorney, Agent, or Firm*—Phillips, Moore, Weissenberger, Lempio & Strabala

[57] ABSTRACT

The invention comprises a transmission control console attachable to a vehicle. The console includes an enclosure with a gear shift regulator extending therefrom, the regulator serving to control the transmission of the vehicle. Generally, the regulator will have forward, reverse, and neutral settings. Also a part of the console is a parking brake actuator adjacent the enclosure, the actuator serving to control a parking brake of the vehicle. Means are provided responsive to movement of the actuator to cause engagement of the parking brake for interlocking the actuator to the regulator only when the regulator is in its neutral setting, whereby shifting out of the neutral setting is prevented when the actuator and the regulator are interlocked, and engagement of the brake is prevented when the regulator is not in the neutral setting.

6 Claims, 3 Drawing Figures

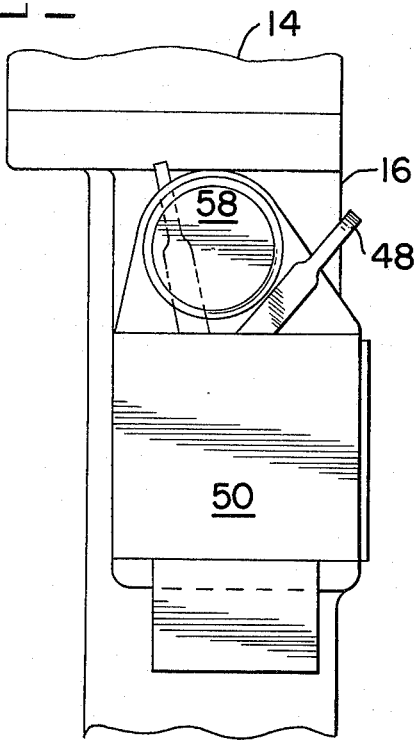
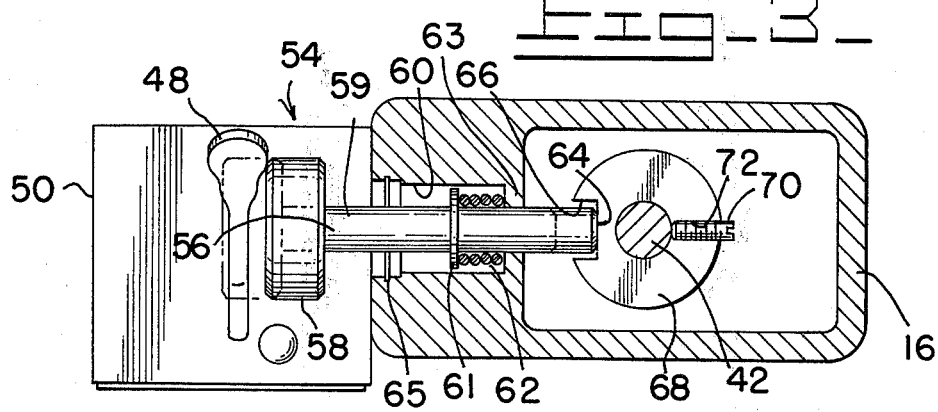

INTERLOCK SYSTEM FOR PARKING BRAKE AND TRANSMISSION CONTROL

BACKGROUND OF THE INVENTION

1. Field of the Invention

The invention relates to a vehicle transmission control console whereby shifting the transmission out of neutral is prevented when the parking brake is set, and whereby setting the parking brake is prevented when the transmission is in other than the neutral position.

2. Prior Art

A number of vehicle transmission control consoles are known which include means for preventing the operating transmission from somehow damaging itself. For example, U.S. Pat. No. 2,989,876 discloses a gear shift mechanism with an interlock which prevents shifting from the higher speed ratios of the transmission into reverse without preliminary engagement of the neutral position.

U.S. Pat. No. 3,480,120 relates to an apparatus for interlocking the transmission and parking brake controls. In this apparatus, interlocking parts between the parking brake and the transmission co-act to shift the transmission control linkage to a neutral position if the parking brake is applied when the transmission is not in neutral.

U.S. Pat. No. 3,566,711 is concerned with a gate plate for a transmission control box which serves in combination with certain slidable lock plates disclosed therein to allow actuation of a subordinate control only when a master control has been set in a particular position which is proper for the state of desired operation of the subordinate control. Also, the subordinate control can, at times, prohibit movement of the master control. The subordinate control may be, for example, a power take-off unit of one sort or another.

U.S. Pat. No. 3,597,991 is concerned with a selector mechanism which provides an automatic cancellation of one mode of operation when a second mode of operation is selected. More particularly, the apparatus disclosed includes two selecta levers which are interconnected by a linkage which includes cam surfaces. The cam surfaces are so constructed that when a forward drive ratio is selected a previously selected park or reverse position is automatically cancelled.

U.S. Pat. No. 3,601,231 relates to a parking brake and to a gear shift selector and parking brake lever controlling the positive locking of a drive shaft by a locking mechanism. The positive lock on the drive shaft prevents the rotation of the drive shaft and prevents the rear wheels of the vehicle from rotating.

U.S. Pat. No. 3,691,867 relates to a safety lever for the power shift transmission of a tractor in which the safety lever is movable to a transmission-unlocking position wherein the safety lever intervenes adjacent the tractor operator's seat to block the exit of the operator from the tractor, and in which the safety lever can be moved to a locking position wherein it no longer intervenes but at the same time either retains the transmission locked in neutral position or forces the transmission to take a neutralized setting and thereby cause the transmission to be retained in that setting.

U.S. Pat. No. 3,692,156 is concerned with a vehicle parking brake release control mechanism which is hydraulically actuated to release the parking brake. Transmission line pressure actuates the mechanism. The apparatus allows the application of the brake through the parking brake control mechanism to stop the vehicle.

U.S. Pat. No. 3,805,640 relates to electronic control means for operating a gear shift mechanism. The mechanism includes a lock-up clutch, operation of the controlling valve of which can be inhibited by the operation of a lock-up clutch solonoid valve.

It is clearly undesirable to drive a motor vehicle when the parking brake is set since this puts an extra strain on the vehicle motor and at the same time wears out the parking brake. To prevent accidental powered movement of a vehicle with the parking brake on, it is highly desirable to insure that the brake cannot be set in position unless the vehicle is first shifted into a neutral position. This prevents accidental actuation of the parking brake mechanism while the vehicle is moving. Further, it is most desirable that a vehicle be provided with a device to prevent an operator from shifting from a neutral position into a drive position when first starting up the vehicle and then driving the vehicle while the parking brake, which has been previously set in an on position, when the vehicle was parked, still remains on. It is further desirable to provide the above set out capabilities in a simple, direct and positive acting mechanism which is easily adjustable and repairable.

Accordingly, it is an object of the present invention to provide a positive acting interlock system for the parking brake and the gear shift regulator of a vehicle wherein the actuator which controls the parking brake also sets into motion means responsive to the movement thereof, which means causes interlocking of the actuator to the regulator only when the regulator is in the neutral setting whereby shifting out of neutral setting is prevented when the actuator and the regulator are interlocked and engagement of the brake is prevented when the regulator is not in the neutral setting.

SUMMARY OF THE INVENTION

The invention comprises a console attachable to a vehicle to control a transmission thereof. The console comprises an enclosure with a gear shift regulator extending therefrom. The regulator serves to control the transmission of the vehicle and has a neutral setting. The parking brake actuator is included adjacent the enclosure, the actuator serving to control the parking brake of the vehicle. Means are provided, responsive to movement of the actuator to cause engagement of the parking brake, for interlocking the actuator to the regulator only when the regulator is in the neutral setting whereby shifting out of the neutral setting is prevented when the actuator and the regulator are interlocked and engagement of the brake is prevented when the regulator is not in the neutral setting.

BRIEF DESCRIPTION OF THE DRAWINGS

FIG. 2 is a view taken along the plane II—II of FIG. 1.

FIG. 3 is a view taken along the plane III—III of FIG. 1.

DETAILED DESCRIPTION OF THE PREFERRED EMBODIMENT

Figure 1:
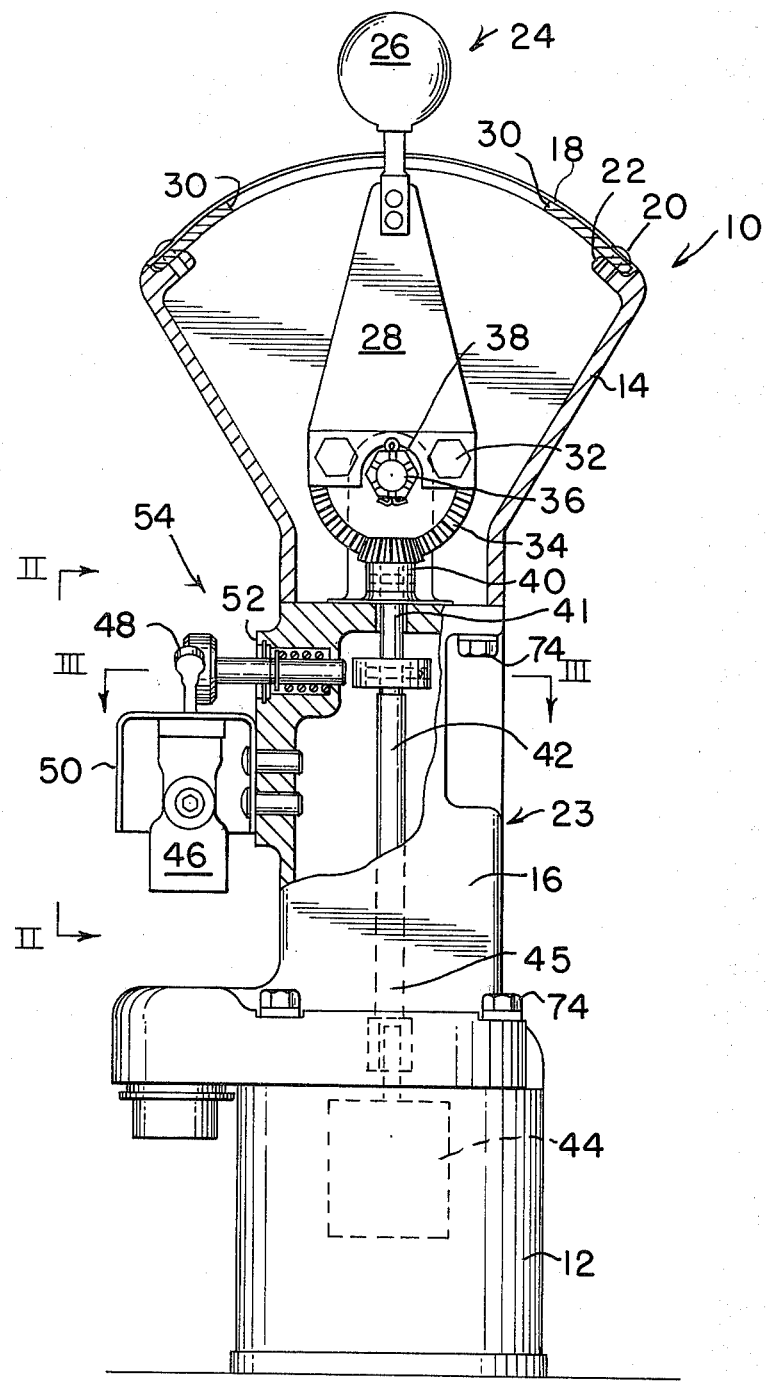
FIG. 1 illustrates in partially sectioned side elevation a vehicle transmission control console of the present invention.

The invention will be better understood by reference to the drawings wherein like numbers denote like parts throughout and the preferred embodiment of the invention is described in detail. It is to be understood that the drawings represent the preferred embodiment of the invention only, and the invention is not meant to be limited thereto.

The modular vehicle transmission control console 10, as illustrated most completely in FIG. 1, includes a base portion 12, a top portion 14 and an intermediate portion 16 with a transmission gate plate member 18 attached by suitable bolt means 20 atop the top portion 14 thereof. The gate plate 18 is removable to provide an access opening 22 for access to the mechanisms enclosed in the console. The base portion 12, the top portion 14 and intermediate portion 16 together form, along with the removable gate plate 18, an enclosure 23 for the console assembly 10.

A vehicle transmission gear shift regulator 24 includes a hand lever member 26 attached to a lever arm member 28, the hand lever member and the lever arm member together comprising the gear shift regulator. The gear shift regulator 24, or more particularly the hand lever member 26 thereof, extends from the gate plate 18 of the enclosure through a channel 30 in the gate plate. The lever arm member 28 is generally made to be flexible so that the vehicle operator can move it transversely to accommodate it to the shape of the channel 30 in the gate plate 18 as in order to follow a particular gear shift pattern which may be set out therein. The lever arm 28 is attached by bolting means 32 to a bevel gear segment 34 which is pivotally mounted on a transversely oriented shaft 36 and contained thereon by locking means 38. The bevel gear segment 34 meshes with a bevel pinion 40 that is mounted on the upper end 41 of a vertically oriented shaft 42 which has a switch mechanism 44 mounted on its lowermost end 45. Movement of the gear shift regulator 24 acts via the bevel gear segment 34 and the bevel pinion 40 to rotate the shaft 42. The switch mechanism 44 signals the transmission of the vehicle, which is not illustrated, as to the speed range selected by the vehicle operator through the use of the hand lever member 26. A conventional wiring harness, also not illustrated, connects the switch mechanism 44 to the transmission of the vehicle. The gear shift regulator 24 has a neutral setting, that is a setting which places the transmission of the vehicle in a neutral position through signaling the vehicle transmission via the switch mechanism 44, to disengage the wheels of the vehicle from the drive train thereof.

A parking brake control valve 46 and an associated parking brake actuator 48 are mounted adjacent the enclosure and more particularly in the preferred embodiment adjacent the intermediate portion 16 thereof. A protective cover 50 is provided generally mounted to an outside surface 52 of the said portion 16 in a location pre-determined to be convenient for the operator. The protective cover 50 serves to protect the valve 46 from being damaged by the operator. The valve 46 serves to provide air pressure to a conventional parking brake valve, which is not illustrated, and thus holds the conventional brake of the vehicle, also not illustrated, in a disengaged position until such time as the operator moves the actuator 48 to its brake-on position as illustrated in phantom in FIG. 2 and as illustrated in FIG. 3. Placement of the actuator 48 in the brake-on position blocks air pressure to the parking brake valve and by exhausting air pressure allows the conventional brake actuator spring members of the brake assembly to apply the brake and thus prevent any vehicle movement. The foregoing description relates to a vehicle fail-safe mechanism whereby the air pressure serves to hold the brake off, while brake application is by a spring gear. An alternate embodiment with the same type parking brake mechanism is equally effective in conjunction with a brake mechanism that is pressure-applied and spring-released. Conventional flexible air hoses, not illustrated, connect the valve 46 to the brake mechanism.

Means 54 are provided for interlocking the actuator 48 to the regulator 24. The interlocking means 54 are restricted to operate only when the regulator 24 is in the neutral setting. The interlocking means 54 include the pin 56 having a head 58 on one end 59 thereof and being adapted to move within a bore 60 in the enclosure 23 and more particularly in the intermediate portion 16 thereof. The axis of the bore 60 is generally perpendicular to the axis of the shaft 42. A ridge 61, for example, a washer weldably attached to the pin, is upraised annularly from the pin at a position intermediate the ends thereof. A compression spiral spring 62 is adapted to bias the ridge 61 against a flange 63 which extends inwardly from said bore to slidably abut said pin adjacent to the other end 64 thereof. The spring 62 thus normally serves to force the pin 56 away from the shaft 42 sufficiently so that the ridge 61 abuts a stopping means 65 which in the particular embodiment illustrated comprises a snap ring press-fitted into the bore 60. With the pin 56 thrown rightwardly, as shown in FIG. 3, the actuator 48 can be moved to the brake-on position. The actuator 48 then serves to interlock with and hold the pin 56 in its rightward position against the force of the spring 62.

The shaft 42 includes a cavity 66 which is adapted to receive the other end 64 of the pin 56. As will be most apparent from FIG. 3, the cavity 66 is adapted to receive the pin 56 only when the shaft 42 is rotated to a particular position, which position more particularly corresponds to the regulator 24 being in its neutral setting. In the embodiment illustrated most clearly in FIGS. 1 and 3, the cavity 66 is formed in a spool 68 which is attached to the shaft 42 by the threaded screw 70 which is inserted into the threaded hole 72 in the spool member and tightened against the shaft 42. The use of the spool 68, the threaded screw 70 and the threaded hole 72 allows adjustment of the spool 68 relative to the shaft 42 whereby alignment problems are minimized. The adjustment is intended to align the cavity 66 with the pin end 64 when the regulator 24 is in the neutral position. The enclosure 23 is generally made of the three portions 12, 14 and 16 so that the spool 68 can easily be reached for adjustment, alignment and the like as by removing the bolt 74.

OPERATION

When the end 64 of the pin 56 is pressed into the cavity 66 (with the regulator 24 in the neutral position) this allows the head 58 of the pin 56 to move inwardly toward the shaft 42 and thereby allows the parking brake actuator 48 to clear the pin head 58 and move to its brake-on position and thereby apply the parking brake through operation of the valve 46. While the pin 56 is pushed into the cavity 66 and held there by the parking brake actuator 48 it is obvious that the shaft 42 and the associated switch 44 and hand lever member 26 cannot be moved from the neutral transmission position.

FIG. 1 illustrates the parking brake actuator 54 in the brake-off position with the pin 56 in its outermost position as it is when the vehicle transmission is in any operating range other than neutral. In this position, the spring 62 forces the ridge 61 and the associated pin 56 outwardly until the ridge 61 is restrained from further outward movement by the stopping means 65 suitable inplaced in the intermediate portion 16 of the enclosure. In this position, the pin head end 58 provides sufficient interference with the parking brake acuator 48 to keep it from being moved into the brake-on position and the pin end 64 provides sufficient clearance with the spool 68 to allow the shaft 42 freedom of movement to any speed range.

Thus, the pin head 58 keeps the parking brake actuator 48 from being put into the brake-on position whenever the transmission is in other than a neutral position and the pin 56, when placed within the cavity 66, prevents the transmission, in particular the shaft 42 of the gear shift regulator 24, from being changed out of the neutral position when the one end 64 of the pin 56 is inserted in the cavity 66.

When the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A console attachable to a vehicle to control a transmission thereof, comprising:
    an enclosure with a slot therethrough;
    a gear shift regulator extending from said enclosure through said slot, said regulator having a handle extending from said enclosure and shaft means within said enclosure, a first end of said shaft means communicating with said handle, said shaft means including a shaft which rotates about its longitudinal axis responsive to movement of said handle in said slot, a second end of said shaft means activating via rotation of said shaft a transmission control switch which controls the transmission of said vehicle and has a neutral setting;
    a parking brake actuator located adjacent where said enclosure surrounds said rotating shaft, said actuator serving to control a parking brake of said vehicle; and
    an interlocking system comprising a pin within a bore in said enclosure, said pin being holdable within said bore by said actuator contacting one end thereof when said actuator is in position to cause engagement of said parking brake, said rotating shaft including a cavity adapted to receive the other end of said pin only when said regulator is in said neutral setting thereby preventing rotation of said rotating shaft, said interlocking system further comprising biasing means to normally bias said pin away from said cavity, said pin being held with its other end in said cavity by said actuator contacting said one end thereof.

2. A console attachable to a vehicle to control a transmission thereof, comprising:
    an enclosure;
    a gear shift regulator extending from said enclosure, said regulator having a handle extending from said enclosure and shaft means within said enclosure, a first end of said shaft means communicating with said handle, said shaft means rotating responsive to movement of said handle, a second end of said shaft means activating a transmission control switch which controls the transmission of said vehicle and have a neutral setting;
    a parking brake actuator adjacent said enclosure, said actuator serving to control a parking brake of said vehicle;
    an interlocking system comprising a pin within a bore in said enclosure, said pin being holdable within said bore by said actuator contacting one end thereof when said actuator is in position to cause engagement of said parking brake, said bore including a flange extending inwardly therefrom to abut said pin adjacent the other end thereof, said pin including an annular ridge upraised therefrom, said shaft means including a cavity adapted to receive the other end of said pin only when said regulator is in said neutral setting, said interlocking system further comprising biasing means comprising a spiral spring interspaced between said flange and said ridge to normally bias said pin away from said cavity, said pin being held with its other end in said cavity by said actuator contacting said one end thereof, said bore including stopping means extending inwardly therefrom to abut said pin adjacent the one end thereof, said stopping means serving to keep said pin from exiting said bore under the impetus of said spring by stopping said ridge thereagainst.

3. A console as in claim 2 wherein said cavity is included in a collar which is attached to said shaft adjacent said bore.

4. A console as in claim 3 including means for adjusting the position of said collar relative to said shaft.

5. A console as in claim 4 wherein an end of said handle within said enclosure includes a bevel gear segment and the one end of said shaft includes a bevel pinion which meshes with said bevel gear segment.

6. A console as in claim 5, wherein said actuator comprises an air valve.

* * * * *